J. LISTER.
Plate-Printing Presses.
No. 197,873. Patented Dec. 4, 1877.
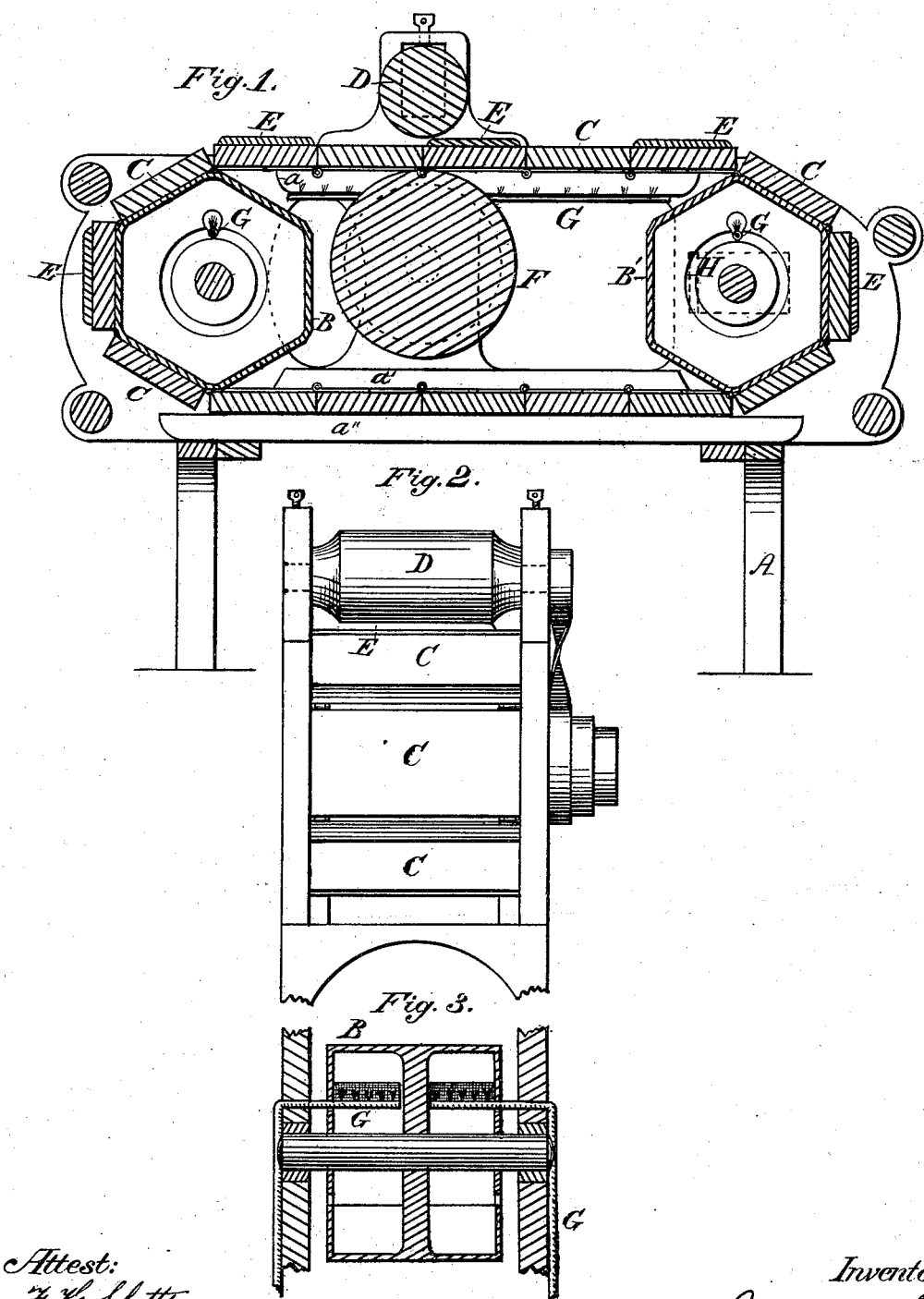
Attest:
F. K. Schott
J. Masoulsoszler
Inventor:
James Lister

UNITED STATES PATENT OFFICE.

JAMES LISTER, OF OAKLAND, CALIFORNIA.

IMPROVEMENT IN PLATE-PRINTING PRESSES.

Specification forming part of Letters Patent No. 197,873, dated December 4, 1877; application filed July 9, 1877.

*To all whom it may concern:*

Be it known that I, JAMES LISTER, of Oakland, county of Alameda, and State of California, have invented certain new and useful Improvements in Plate-Printing Presses, of which the following is a specification:

My invention consists in the construction of a plate-printing press to be driven by steam or other power, in which the bed, plank, or table, as it is variously termed, passes under the impression cylinder or roller with a continuous forward motion, instead of an intermitting and reciprocating motion.

To accomplish this I construct the table, composed of equal and uniform parts or sections, closely and accurately hinged together, so as to present a continuous uniform surface when passing forward under the impression-roller, and sectional surfaces when passing around revolving polygonal drums or wheels, whose sides or faces conform to the inner surfaces of the sections of the table, which are endlessly hinged together, so as to be carried around in manner and form of a belt or endless apron. The engraved plates are fixed upon the different sections of the table as may be convenient from their relative size, and heated and otherwise prepared, as shown in the drawings and hereinafter described; or, if more convenient for any reason, as when a large plate is used with a small press, they may be first prepared, then placed on and removed from the table as in the hand-presses now generally in use.

Figure 1 represents a longitudinal section of the press. Fig. 2 is an end view of the press. Fig. 3 is an interior view of one of the polygonal drums, showing a method of applying the heating apparatus.

A represents the frame of the machine; B B', the two polygonal drums, mounted transversely at opposite ends of the frame; C C, the sectional table, extending lengthwise of the frame and around the two drums, with a continuous surface between the drums and sectional surfaces around them; D, the impression-roller, mounted transversely on the top of the frame, above the table; E E, the engraved plates, made fast to different sections of the table by screws or other device, or merely placed on it; F, an anti-friction cylinder, mounted transversely within the frame, directly underneath the impression-roller; G G, gas-pipes for heating the plates; H, adjustable bearings, in which the drum B' is mounted.

On the inner surfaces of the sides of the frame A, near the top and bottom, are guide-rails $a$ $a^1$ $a^2$, which support the table horizontally, and form sliding ways, along which it moves. The cylinder F is raised slightly above the upper rails, so as to relieve the friction of the table on them while the impression is being made.

The operation of the press is as follows: The driving-drum B being revolved, the table C is moved forward along the ways between the drums and under the impression-roller D with a continuous or unbroken surface, and with broken surface, by sections, around the drum B, returning to and around the drum B' in like manner; the cylinder F and the drum B' revolving by friction of the moving table, while the impression-roller D is rotated by friction of the engraved plates, or in such other manner (preferably by belting, as shown in Fig. 2) as to revolve at precisely the same speed as the table is carried.

The journal of the carrying-drum B' is mounted in adjustable bearings H, urged outward by means of springs or screws to give proper tension, so that the outer faces of the drums will at all times press firmly and accurately against the sections of the table with which, in revolving, they successively come in contact. These drums may be made of six or more sides or faces.

The plates E are heated to a proper temperature by the flame of gas-jets, or equivalent, underneath the table, while moving forward between the drums, and also within the drums, if necessary. Fig. 2 shows a method of introducing the gas within the drums; or the ends of the drums may be made solid, except an aperture for air and lighting the gas, in which case, no central shaft being required, the gas-pipe is introduced through the center of a journal on which the drum revolves.

The press is so constructed as to give free access to the plates, so that they may be inked, wiped, and properly cleaned, and the paper applied before reaching the impression-roller. By constructing a press of sufficient length, so that the requisite number of persons may stand at the sides of the table, and operate in the necessary preparation of the plates as they pass, plate-printing may be done with great rapidity, even without the use of an automatic inking or wiping apparatus, both of which may be attached, if desired. A registering apparatus may also be attached, so as to register the whole number of impressions made, or the number made by each plate separately, if preferred.

This press may also be adapted to ordinary printing, in which case the sections of the table are used as beds for carrying the type or type-plates, or merely as platens, the type or type-plates being upon the cylinder. An automatic inking arrangement, such as the ordinary arrangement of rolls, will then be attached.

Having thus described my invention, what I claim, and desire to secure by Letters Patent, is—

1. In a plate-printing press, a sectional table composed of equal and uniform parts, closely and endlessly hinged together, in combination with the impression-roller, substantially as shown and described.

2. In a plate-printing press, a sectional table endlessly hinged together, in combination with the two polygonal drums and the ways at the top and bottom of the frame, substantially as shown and described.

3. In a plate-printing press, a sectional table endlessly hinged together, mounted on polygonal drums, in combination with the impression-roller and anti-friction cylinder, substantially as and for the purposes shown and described.

4. In a plate-printing press, a sectional table, mounted on polygonal drums, in combination with the impression-roller, the anti-friction cylinder, and the heating apparatus, substantially as and for the purposes shown and described.

5. The combination of the sectional table and the heating apparatus, applied to its under surface, between the drums, substantially in the manner shown and described.

In testimony that I claim the foregoing as my own I affix my signature in presence of two witnesses.

JAMES LISTER.

Witnesses:
 J. C. TASKER,
 H. B. TITUS.